(12) United States Patent
Takinai

(10) Patent No.: US 11,447,014 B2
(45) Date of Patent: Sep. 20, 2022

(54) FAULT DETECTION DEVICE

(71) Applicant: DENSO CORPORATION, Kariya (JP)

(72) Inventor: Shingo Takinai, Kariya (JP)

(73) Assignee: DENSO CORPORATION, Kariya (JP)

( * ) Notice: Subject to any disclaimer, the term of this patent is extended or adjusted under 35 U.S.C. 154(b) by 709 days.

(21) Appl. No.: 16/505,853

(22) Filed: Jul. 9, 2019

(65) Prior Publication Data

US 2020/0023742 A1    Jan. 23, 2020

(30) Foreign Application Priority Data

Jul. 23, 2018    (JP) .............................. JP2018-137825

(51) Int. Cl.
| | |
|---|---|
| *H02P 1/00* | (2006.01) |
| *B60L 3/04* | (2006.01) |
| *B60L 53/24* | (2019.01) |
| *B60L 50/51* | (2019.01) |
| *B60L 3/00* | (2019.01) |

(52) U.S. Cl.
CPC ............... *B60L 3/04* (2013.01); *B60L 3/0046* (2013.01); *B60L 50/51* (2019.02); *B60L 53/24* (2019.02)

(58) Field of Classification Search
CPC .. B60L 3/0046; B60L 2240/547; B60L 53/24; B60L 3/04; B60L 50/51; Y02T 90/14; Y02T 10/7072; Y02T 10/70; H01H 47/002
See application file for complete search history.

(56) References Cited

U.S. PATENT DOCUMENTS

| | | | | |
|---|---|---|---|---|
| 6,002,221 A | * | 12/1999 | Ochiai | ................. B60L 3/0023 318/811 |
| 10,933,751 B2 | * | 3/2021 | Masui | ............... H02M 3/33584 |
| 2014/0152261 A1 | * | 6/2014 | Yamauchi | ............... B60L 58/24 320/118 |
| 2017/0317514 A1 | * | 11/2017 | Kawamura | ........... H02J 7/0034 |

FOREIGN PATENT DOCUMENTS

| | | |
|---|---|---|
| JP | 3097723 B2 | 2/1995 |
| JP | 2000-270561 A | 9/2000 |
| JP | 3536716 B2 | 9/2000 |

* cited by examiner

*Primary Examiner* — Jared Fureman
*Assistant Examiner* — Esayas G Yeshaw
(74) *Attorney, Agent, or Firm* — Posz Law Group, PLC

(57) ABSTRACT

A fault detection device has a pair of power supply lines connected to a high voltage battery via power supply relays. Capacitors and inverters for driving a motor are disposed between the power supply lines. A controller in the fault detection device controls the inverters to discharge the capacitors at different times after the power supply from the battery to motor is stopped by switching OFF the power relays. The controller then determines whether the capacitor voltage has dropped after each capacitor is discharged. Based on the determination result of the voltage drop in each of the capacitors, the controller can determine whether the power supply relays or the capacitors are malfunctioning.

14 Claims, 3 Drawing Sheets

FAULT DETECTION DEVICE

CROSS REFERENCE TO RELATED APPLICATION

The present application is based on and claims the benefit of priority of Japanese Patent Application No. 2018-137825, filed on Jul. 23, 2018, the disclosure of which is incorporated herein by reference.

TECHNICAL FIELD

The present disclosure relates to a fault detection device in a vehicle.

BACKGROUND INFORMATION

Contact welding may occur in power supply relays where one or more contacts on the relay stick in position and prevent the relay from opening and/or closing. While fault detection devices may be able to detect when contact welding occurs in power supply relays, other components/elements in the electrical circuit with the power supply relays may malfunction causing a false positive identification of a power supply relay malfunction. In other words, when other components in the circuit malfunction, it may give the appearance that the power supply relay(s) in the circuit is/are malfunctioning. As such, fault detection devices are subject to improvement.

SUMMARY

The present disclosure describes a fault detection device configured to detect contact welding/contact sticking faults (i.e., ON faults) in a power supply relay, and to distinguish such ON faults from abnormalities occurring in the discharge function in the discharge of a capacitor by a motor driver.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Fault detection devices exist for detecting the sticking of a relay contact in a power supply relay (i.e., contact welding). Power supply relays may be disposed at positions between an electrical power source (e.g., high voltage battery) and load (e.g., electrical motor) on power supply lines to control the supply of electric power to an electric motor.

When the power supply is turned OFF to cut the power between the power supply and the electric motor, a controller may control the discharge of a capacitor connected at position between the pair of power supply lines (i.e., between the power supply line and the power return line) by controlling a motor driver. The controller instructs the motor driver to connect (e.g., make an electric connection) the phase windings of the motor to the pair of power supply lines to discharge the capacitor.

The controller then checks the voltage of the power supply line after the capacitor is discharged and compares the voltage to a predetermined threshold value. If the voltage of the power supply line is higher than a predetermined value, the controller determines that the power relay is malfunctioning (e.g., contact sticking/contact welding).

In cases where the capacitor is malfunctioning so that there is a malfunction in discharging the electric charge stored in the capacitor, the controller may falsely detect that the power supply relay is malfunctioning, even if the power supply relay is functioning normally. Such a misdetection of contact welding in the power supply relay may lead to an unnecessary corrective measure such as a fail-safe operation or a warning notification notifying a vehicle user to repair or replace the power supply relay when such repair or replacement is unnecessary.

The present disclosure describes a fault detection device configured to detect contact welding/contact sticking faults (i.e., ON faults) in a power supply relay, and to distinguish such ON faults from abnormalities occurring in the discharge function in the discharge of a capacitor by a motor driver/inverter.

By using the fault detection device of the present disclosure, the controller can distinguish the ON fault of the power supply relay and the abnormality of the discharge function from each other. Consequently, the fault detection device may limit and/or prevent inappropriate fail-safe operations and the unnecessary repair and replacement of vehicle components.

Embodiments in the present disclosure are described with reference to the accompanying drawings.

[Configuration]

Figure 1:
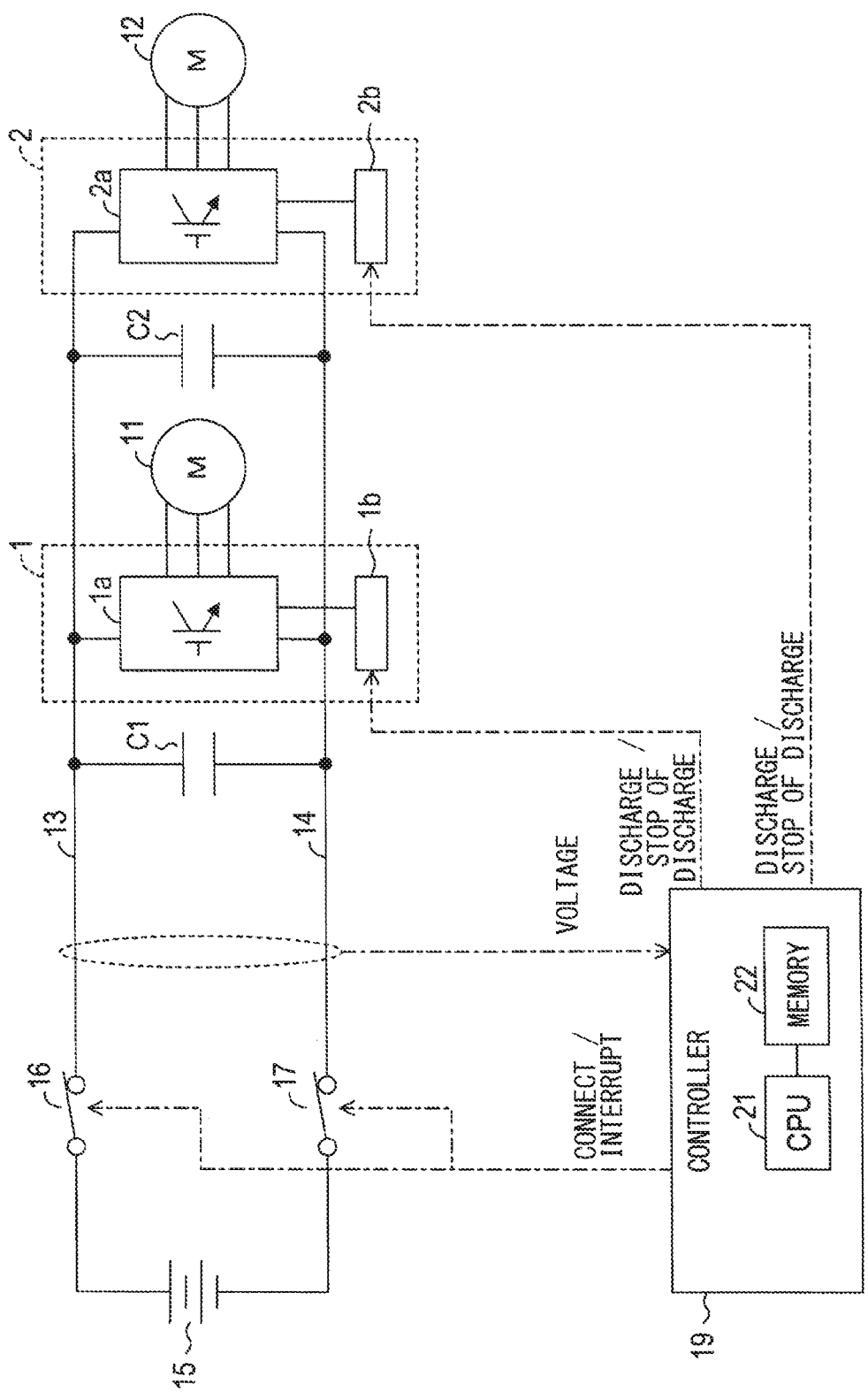
FIG. 1 illustrates a block diagram of a control system in a first embodiment and second embodiment of the present disclosure.

FIG. 1 illustrates a vehicle control system that controls two motors 11 and 12. Both the motors 11 and 12 may be electric motors used to propel a vehicle (e.g., a traction motor). For example, the motor 11 provides drive power to rear wheels of the vehicle and the motor 12 provides drive power to front wheels of the vehicle. In addition to being electric motors, the motors 11 and 12 may also be motor generators that function as electric generators. The motors 11 and 12 as electric generators may be used to produce electricity, for example, during a regenerative braking operation. The control system of FIG. 1 may be used to perform diagnostic processes described in the various embodiments.

The motor 11 is driven by an inverter device 1 that functions as a motor driver. The motor 12 is driven by an inverter device 2 that also functions as a motor driver. The inverter device may be referred to more simply as "an inverter" (e.g., the inverter 1, the inverter 2). The inverters 1 and 2 may also be referred to as motor drivers 1 and 2.

Electric power is supplied to the motor 11 from a pair of power supply lines 13 and 14 via the inverter 1. Electric power is supplied to the motor 12 from the pair of power supply lines 13 and 14 via the inverter 2. The power supply line 13 is a high side power supply line (e.g., a power supply line connected to a positive terminal of a battery and on the power supply path from the battery to the motors 11 and 12). The power supply line 14 is a low side power supply line (e.g., a power supply line connected to a negative terminal of a battery and on the power return path from the motors 11 and 12).

The inverter 1 includes an inverter circuit 1a having a plurality of switching elements that switch ON and OFF to control the power supply to the windings for each phase of the motor 11 and a control circuit 1b for controlling the ON and OFF switching of the plurality of switching elements in the inverter circuit 1a. The inverter 2 includes an inverter circuit 2a and a control circuit 2b for controlling the power supplied to the motor 12. The inverter circuit 2a and the control circuit 2b function similarly to the inverter circuit 1a and the control circuit 1b.

Capacitors C1 and C2 are connected between the power supply lines 13 and 14 for stabilizing the power supply voltage (e.g., of the electric power respectively supplied from the power supply to the inverters 1 and 2). The capacitors C1 and C2 are connected to each of the power supply lines 13 and 14 with one terminal of the capacitors C1 and C2 connected to the power supply line 13 and one terminal of the capacitors C1 and C2 connected to the power supply line 14. The capacitor C1 is disposed near the inverter 1, and the capacitor C2 is disposed near the inverter 2. The capacitors C1 and C2 may be respectively included as elements in the inverters 1 and 2 (e.g., integrated into the inverters 1 and 2).

The power supply line 13 is connected via a power supply relay 16 to the positive or high side of a high voltage battery 15. The high voltage battery 15 is a power source that supplies power to the motors 11 and 12 respectively via the inverters 1 and 2. The power supply line 14 is connected via a power supply relay 17 to the negative or low side of the high-voltage battery 15.

The power supply relays 16 and 17 are relays that are configured to open and close (i.e., switch between opened and closed positions) to supply power to the drive systems of the motors 11 and 12 and to interrupt the power supply to the drive systems. The power supply relays 16 and 17 may function as system main relays (SMRs) and be respectively referred to simply as SMR 16 and SMR 17.

The vehicle control system further includes a controller 19 for controlling the SMRs 16 and 17 and the inverters 1 and 2. The controller 19 switches the SMRs 16 and 17 between a connection position/state (i.e., ON) and an interruption position/state (i.e., OFF) to control the power supply to/from the high voltage battery 15.

The controller 19 turns ON the SMRs 16 and 17 by outputting drive signals to the SMRs 16 and 17. The output of the drive signals to the SMRs 16 and 17 corresponds to outputting an ON instruction for turning ON the SMRs 16 and 17. When the SMRs 16 and 17 are turned ON, the high-voltage battery 15 and the power supply lines 13 and 14 are connected. In addition, the controller 19 turns OFF the SMRs 16 and 17 by stopping/interrupting the output of the drive signals to the SMRs 16 and 17. Stopping the output of drive signals to the SMRs 16 and 17 corresponds to outputting an OFF instruction to turn OFF the SMRs 16 and 17. When the SMRs 16 and 17 are turned OFF, the high-voltage battery 15 and the power supply lines 13 and 14 are disconnected from each other.

The controller 19 outputs at least a discharge instruction and a discharge stop instruction to the inverters 1 and 2. The controller 19 may control the discharge of the capacitors C1 and C2 via the inverters 1 and 2 after a vehicle power switch is switched OFF. In the inverter 1, the control circuit 1b turns ON two or more switching elements in the inverter circuit 1a after receiving the discharge instruction. When the two or more switching elements in the inverter circuit 1a are turned ON by the discharge instruction, the windings of the motor 11 are connected via the inverter 1a to the power supply lines 13 and 14, which causes the capacitors C1 and C2 to discharge. The capacitors C1 and C2 will continue to discharge so long as charge remains in the capacitors C1 and C2 until the inverter 1 receives the discharge stop instruction. When the inverter 1 receives the discharge stop instruction, the control circuit 1b turns OFF the two or more switching elements in the inverter circuit 1a and the windings of the motor are disconnected from the power supply lines 13 and 14 to stop the discharge of the capacitors C1 and C2.

In a similar manner, the control circuit 2b turns ON two or more switching elements in the inverter circuit 2a after receiving the discharge instruction. When the two or more switching elements in the inverter circuit 2a are turned ON by the discharge instruction, the windings of the motor 12 are connected via the inverter to the power supply lines 13 and 14, which cause the capacitors C1 and C2 to discharge. The capacitors C1 and C2 will continue to discharge so long as charge remains in the capacitors C1 and C2 until the inverter 2 receives the discharge stop instruction. When the inverter 2 receives the discharge stop instruction, the control circuit 2b turns OFF the two or more switching elements in the inverter circuit 2a and the windings of the motor are disconnected from the power supply lines 13 and 14 to stop the discharge of the capacitors C1 and C2.

The controller 19 may instruct the inverters 1 and 2 to discharge the capacitors C1 and C2 at different times. For example, the controller 19 may first instruct the inverter 1 to discharge the capacitors C1 and C2 and then stop the discharge of the capacitors C1 and C2. Then, the controller 19 may instruct the inverter 2 to discharge the capacitors C1 and C2 so that the inverter 1 is not discharging the capacitors C1 and C2 at the same time as the inverter 2.

The controller 19 includes a small computer (i.e., a "computer" or "microcomputer") such as a microcontroller or a system on a chip (SoC) having a CPU 21 and a semiconductor memory 22 such as RAM or ROM. Each function performed by the controller 19 may be realized by the CPU 21 executing a program/instruction set (i.e., software) stored in a non-transitory, tangible storage medium. The memory 22 is an example of a non-transitory, tangible storage medium that stores the program/instruction set. By executing the program, the controller 19 performs a method corresponding to the program.

Although not shown in the drawing, the controller 19 may include, for example, a voltage divider circuit an analog-to-digital converter (A/D converter). The voltage divider circuit includes a plurality of resistors for dividing a voltage between the power supply lines 13 and 14 to detect/determine the voltage between the power supply lines 13 and 14. The A/D converter converts the voltage divided by the resistors from an analog voltage to a digital voltage. Alternatively, or in addition to the voltage divider circuit, the controller 19 may be configured to detect the voltage between the power supply lines 13 and 14 based on a signal from a sensor (not shown) that detects the voltage between the power supply lines 13 and 14. As shown in FIG. 1, the voltage measured between the power supply lines 13 and 14 is measured at a location indicated by a dashed ellipse. The voltage is measured at a location on one side of the SMRs 16 and 17 opposite the high voltage battery 15. The voltage measured at the location indicated by the dashed ellipse in FIG. 1 corresponds to the voltage across the capacitors C1 and C2 (i.e., the inter-terminal voltage of the capacitors C1 and C2).

Alternatively, the voltage divider circuit in the controller 19 may be used to detect/determine the voltage of the high voltage battery 15, with the A/D converter used for an analog to digital conversion of the divided voltage. The controller 19 may also be configured to detect the voltage of the high voltage battery 15 based on a signal from a sensor (not shown) that detects the voltage of the high voltage battery 15. The voltage of the high voltage battery 15 may be the voltage measured between the positive, high side terminal and the negative, low side terminal of the high voltage battery 15.

The controller 19 may include one computer or a plurality of computers. The method(s) for realizing each function of the controller 19 is/are not limited to being realized by the execution of software. That is, all or part of the functions performed by the controller 19 may be realized by hardware or a combination of software and hardware. For example, the functions performed by the controller 19 may be realized by a combination of circuit elements configured to perform a function associated with the controller 19, where such circuit elements may include analog circuit elements, digital circuit elements, logical circuit elements, or a combination of circuit elements. The functions performed by the controller 19 may also be realized by specialized circuits such as application-specific integrated circuits (ASICs) or field-programmable gate arrays (FPGAs).

1. First Embodiment

[1-1. Process]

A diagnostic process performed by the controller 19 is described with reference to the flowchart in FIG. 2.

Figure 2:
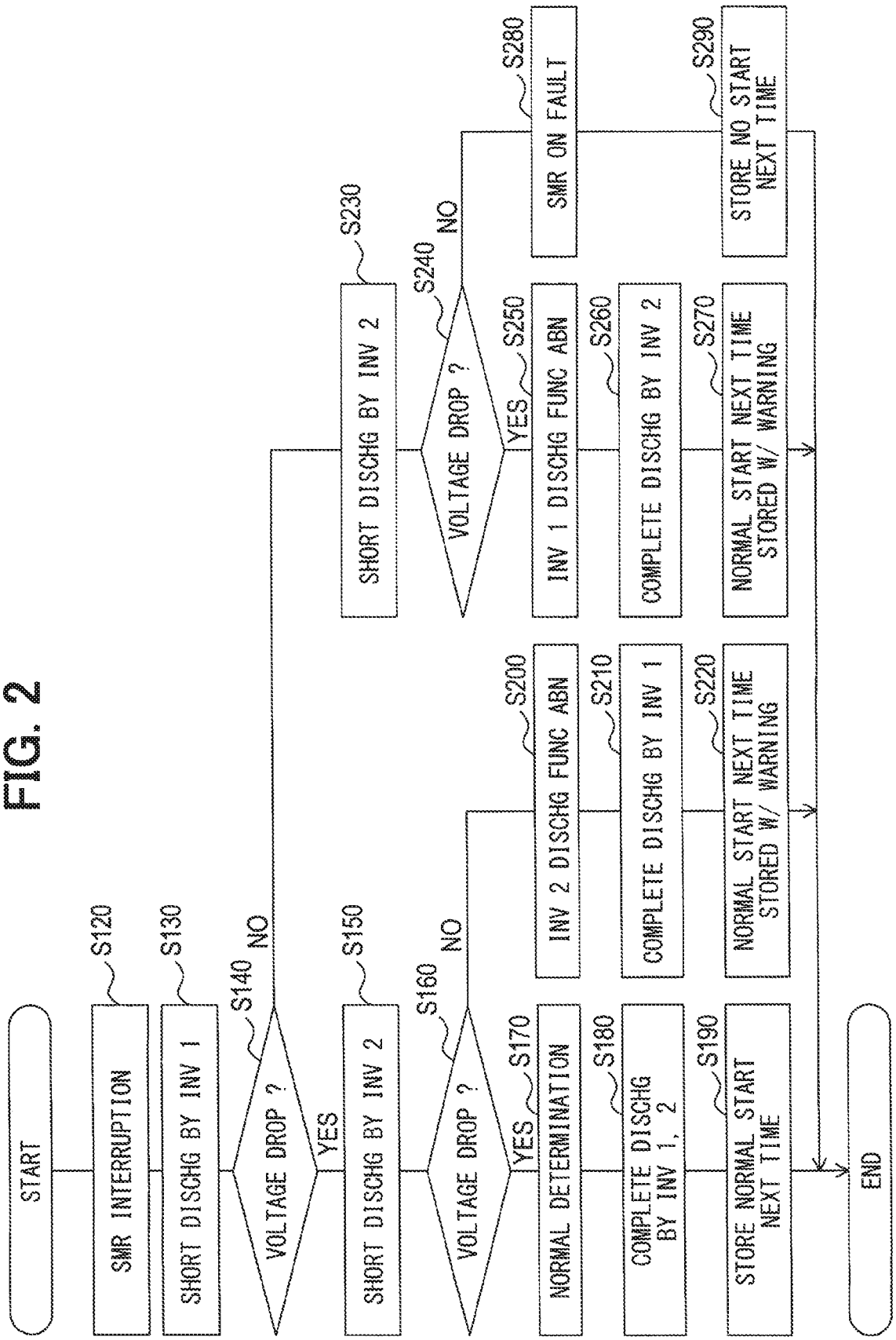
FIG. 2 is a flowchart of a diagnostic process in the first embodiment.

The diagnostic process shown in FIG. 2 is a process for distinguishing and detecting faults in the SMRs 16 and 17 when the SMRs 16 and 17 are stuck in the ON position/state (i.e., ON faults), for example, due to contact welding/contact sticking in the SMRs 16 and 17. In addition to distinguishing and detecting ON faults, the diagnostic process also detects abnormalities in the discharge functions of each of the inverters 1 and 2 and distinguishes such abnormalities from the ON faults.

The ON fault is a fault in which the SMRs 16 and 17 remain in the ON state. For example, the SMRs 16 and 17 may remain ON despite the controller 19 stopping the output of the drive signals to the SMRs 16 and 17 to turn the SMRs 16 and 17 OFF. One ON fault of the SMRs 16 and 17 may be contact welding where there are problems with the relay contacts sticking/welding together.

The discharge function of the inverters 1 and 2 is a function for discharging the capacitors C1 and C2. The abnormalities in the discharge function may mean malfunctions in the devices used for discharging the capacitors C1 and C2 as well as the capacitors C1 and C2 themselves. For example, malfunctions in the control circuits 1b and 2b that perform the discharge process upon receiving a discharge instruction, malfunctions in the terminals used to perform the discharge process, and malfunctions in sensors and other devices used in the discharge process of the capacitors C1 and C2 may all be considered as abnormalities of the discharge function. Abnormalities in the discharge function may also refer to abnormalities in the discharge control of at least one of the capacitors C1 and C2 performed by at least one of the plurality of motors drivers 1 and 2. When an abnormality of the discharge function occurs, even if a discharge instruction is output from the controller 19 to the inverters 1 and 2, a discharge of the capacitors C1 and C2 will not occur.

The controller 19 starts the diagnostic process of FIG. 2 when a user of the vehicle turns OFF a power switch (i.e., ignition switch) of the vehicle. Turning OFF the power switch of the vehicle satisfies a condition for turning OFF the SMRs 16 and 17. Turning OFF the power switch is an operation that stops the drive power/propulsion of the vehicle. Any conditions for turning OFF the SMRs 16 and 17 may also be conditions for stopping the control of the motors 11 and 12.

As shown in FIG. 2, when starting the diagnostic process, at S120, the controller 19 performs an interruption process to turn the SMRs 16 and 17 from ON to OFF. Specifically, at S120, the controller 19 turns OFF the SMRs 16 and 17 by stopping the output of the drive signals to the SMRs 16 and 17.

At S130, the controller 19 outputs discharge instructions to the inverter 1 to discharge the capacitors C1 and C2 for a short period of time. The process at S130 may be referred to as a "short discharge time" and the short discharge time is an amount of time that discharges the capacitors C1 and C2 to some degree without fully discharging the capacitors C1 and C2. For example, if the voltage of the high voltage battery 15 is set to voltage "VB" and the capacitor voltage is set to voltage "VC," the short discharge time is set to be a discharge period that lowers the capacitor voltage VC by about ⅓ of the battery voltage VB. The discharge of the capacitors C1 and C2 may be referred to more simply as "the discharge."

At S140, the controller 19 determines whether the capacitor voltage has dropped due to the discharge by the inverter 1 at S130. For example, the controller 19 detects the capacitor voltage VC before instructing the inverter 1 to perform the discharge at S130 and then detects the capacitor voltage VC after instructing the inverter 1 to stop the discharge. If the difference between the capacitor voltage VC before the discharge and the capacitor voltage VC after the discharge is greater than a predetermined value, the controller 19 determines that the capacitor voltage VC has dropped on account of the discharge. The controller 19 may also be configured to determine whether the capacitor voltage VC after the discharge is lower than a preset drop determination value. In this case, if the capacitor voltage VC is lower than the drop determination value (i.e., a threshold value), the controller 19 may determine that the capacitor voltage VC has dropped on account of the discharge.

At S140, if the controller 19 determines that the capacitor voltage VC has dropped, i.e., "YES" at S140, the process proceeds to S150. At S150, the controller 19 outputs discharge instructions to the inverter 2 to discharge the capacitors C1 and C2 for a predetermined short discharge time similar to the process at S130.

At S160, similar to the process at S140, the controller 19 determines whether the capacitor voltage VC has dropped due to the discharge by the inverter 2 at S150. When the controller 19 determines that the capacitor voltage VC has dropped, i.e., "YES" at S160, the process proceeds to S170.

At S170, the controller 19 determines that the control system of the SMRs 16 and 17 and inverters 1 and 2 is normal and stores the normal determination in the memory 22 as a diagnostic result. The determination of "normal" here means that there are no ON faults in the SMRs 16 and 17 and that there are no abnormalities in the discharge function of each of the inverters 1 and 2.

The diagnostic process proceeding from S160 to S170 means that, based on the drop in the capacitor voltage VC determined by the controller 19 at S140, (i) the discharge/discharge function performed by the inverter 1 is normal, and (ii) both of the SMRs 16, 17 are confirmed as being OFF (i.e., turned OFF). A discharge that can be performed by at least one of the inverters 1 and 2 means that the SMRs 16 and 17 are turned OFF and that there are no ON faults with the SMRs 16 and 17. By determining at S160 that the capacitor voltage VC drops, the controller 19 confirms that the discharge/discharge function performed by the inverter 2 is normal. As such, by proceeding from S160 to S170, the controller 19 can determine (i.e., confirm) that the control of the SMRs 16 and 17 and inverters 1 and 2 by the controller 19 and control circuits 1b and 2b is normal.

When the controller 19 determines that the control operation is normal at S170, the process proceeds to S180 and the controller 19 instructs either one or both of the inverters 1 and 2 to completely discharge the capacitors C1 and C2. For example, the controller 19 outputs a discharge instruction to the inverters 1 and 2 to perform a discharge until the capacitor voltage VC is equal to or less than a predetermined discharge completion determination value. In this example, the discharge completion determination value is 0 V.

At S190, the controller 19 stores a "normal start next time" instruction to memory and ends the diagnostic process. The next time means the next time the power switch of the vehicle is turned ON. A normal start means turning ON the SMRs 16 and 17 for controlling the motors 11 and 12 via the inverters 1 and 2 when the power switch of the vehicle is turned ON.

When the controller 19 determines that the capacitor voltage VC has not dropped on account of the discharge performed by the inverter 2 at S160, i.e., "NO" at S160, the process proceeds to S200. At S200, the controller 19 determines that the discharge function of the inverter 2 is abnormal and stores the determination in the memory 22 as the diagnostic result.

When the process proceeds from S160 to S200, it means that, based on the drop of the capacitor voltage VC determined by the controller 19 at S140, (i) the discharge/discharge function by the inverter 1 is normal, and (ii) both of the SMRs 16 and 17 are turned OFF (i.e., no ON faults with the SMRs 16 and 17). It also means that the discharge function of the inverter 2 is abnormal based on the determination by the controller 19 that the capacitor voltage VC did not drop at S160.

After the process at S200, the process proceeds to S210 and the controller 19 outputs a discharge instruction to the inverter 1, which is confirmed as having a normal discharge function. The discharge instruction to the inverter 1 controls the inverter 1 to completely discharge the capacitors C1 and C2. For example, the controller 19 controls the inverter 1 to perform the discharge until the capacitor voltage VC is equal to or less than the discharge completion determination value.

At S220, the controller 19 stores a "normal start next time with abnormality warning" instruction to the memory 22 and then ends the diagnostic process. After storing the "abnormality warning" and the vehicle power switch is turned OFF, the controller 19 performs a process to notify a user of the vehicle about an abnormality in the inverter 2 when the power switch of the vehicle is subsequently turned ON. For example, the controller 19 may turn ON a warning lamp indicating the occurrence of the abnormality or control a display device to display a message indicating the occurrence of the abnormality. Even if the discharge function of the inverter 2 is abnormal, the discharge can still be performed by another normal inverter 1, and as such, such an abnormality may not cause urgent issues with the drive of the vehicle and the recharging of the high voltage battery 15. In sum, in this example the controller 19 permits the start of the motors 11 and 12, but also performs a notification procedure to prompt the vehicle user to attend to or fix the abnormality by notifying the vehicle user of the occurrence of the abnormality in the inverter 2.

On the other hand, if the controller 19 determines at S140 that the capacitor voltage VC does not drop on account of the discharge performed by the inverter 1, i.e., "NO" at S140, the process proceeds to S230.

At S230, the controller 19 outputs a discharge instruction to the inverter 2 to discharge the capacitors C1 and C2 for a predetermined short discharge time, similar to the process performed at S150.

At S240, similar to the process performed at S160, the controller 19 determines whether the capacitor voltage VC drops on account of the discharge process performed by the inverter 2 at S230.

When the controller 19 determines that the capacitor voltage drops, i.e., "YES" at S240, the process proceeds to S250. At S250, the controller 19 determines that the discharge function of the inverter 1 is abnormal, and stores the abnormal determination contents in the memory 22 as a diagnostic result.

When the diagnostic process proceeds from S240 to S250, it means, based on the drop of the capacitor voltage VC determined by the controller 19 at S240, that (i) the discharge function of the inverter 2 is normal, and that (ii) both of the SMRs 16 and 17 are OFF (i.e., no ON faults in the SMRs 16 and 17). When the controller 19 determines at S140 that the capacitor voltage VC does not drop, the controller 19 determines that the discharge function of the inverter 1 is abnormal.

Chronologically, when the controller 19 determines that the capacitor voltage does not drop at S140, it means that either (i) the discharge function of the inverter 1 is abnormal or (ii) the SMRs 16 and 17 have an ON fault. Then, when the controller 19 determines that the capacitor voltage VC drops at S240, the controller 19 determines that the discharge function of the inverter 2 is normal and both the SMRs 16 and 17 are OFF, thereby identifying that the discharge function of the inverter 1 is abnormal.

After S250, the process proceeds to S260. At S260, the controller 19 outputs a discharge instruction to the inverter 2, which the controller 19 determines at S240 as having the normal discharge function, to instruct the inverter 2 to completely discharge the capacitors C1 and C2. For example, the controller 19 controls the inverter 2 to discharge the capacitors C1 and C2 until the capacitor voltage VC is equal to or less than the discharge completion determination value.

At S270, similar to the process at S220, the controller 19 stores a "normal start next time, with abnormality warning" instruction to the memory 22 and then ends the diagnostic process. Even if the discharge function of the inverter 1 is abnormal, the discharge can still be performed by the normal inverter 2, and as such, the abnormality in the inverter 1 may not cause urgent issues with the drive of the vehicle and the recharging of the high voltage battery 15. In this example the controller 19 permits the start of the motors 11 and 12, but also performs a notification procedure to prompt the vehicle user to attend to or fix the abnormality by notifying the vehicle user of the occurrence of the abnormality in the inverter 1.

When the controller 19 determines at S240 that the capacitor voltage VC does not drop on account of the discharge process by the inverter 2, i.e., "NO" at S240, the process proceeds to S280. At S280, the controller 19 determines that the SMRs 16 and 17 have ON faults, and stores the ON fault determination in the memory 22 as a diagnostic result.

When the process proceeds from S240 to S280, it means, based on the determinations at both of S140 and S240 that the capacitor voltage VC does not drop, that the discharge function of both the inverter 1 and the inverter 2 has been disabled. As such, the controller 19 determines that the SMRs 16 and 17 both have the ON fault. There is a low probability that both the inverters 1 and 2 will have abnormalities with the discharge function at the same time.

After S280, the process proceeds to S290 and the controller 19 stores a "no start next time" instruction to the memory 22 and then ends the diagnostic process. A "no start next time" instruction means that the control system 19 is prohibited from starting and performing its control functions the next time the vehicle is started (i.e., the next time the vehicle start switch is turned ON). When the controller 19 stores the "no start next time" instruction, even if the power switch of the vehicle is turned ON, the controller 19 does not start the motors 11 and 12. For example, the controller 19 does not perform the process of turning ON the SMRs 16 and 17 and the process of controlling the motors 11 and 12. In other words, since the controller 19 determines that the SMRs 16 and 17 are unable to be turned OFF (i.e., the power supply from the high voltage battery 15 to the motors 11 and 12 cannot be interrupted by the SMRs 16 and 17), the controller 19 initiates a fail-safe procedure to prohibit the start of the motors 11 and 12 until the SMRs 16 and 17 are repaired.

[1-2. Effects]

The first embodiment may realize a variety of advantageous effects.

In the processes at S120 to S160 (i.e., S120, S130, S140, S150, and S160), S230, and S240, the controller 19 performs the interruption process to turn OFF the SMRs 16 and 17, and thereafter causes the respective inverters 1 and 2 to perform a discharge process at different times. Then, every time each of the inverters 1 and 2 performs a discharge process, the controller 19 determines whether the capacitor voltage VC drops to determine whether the inverter has performed the discharge process and is functioning normally. In other words, the controller performs a voltage drop determination to determine whether the inverters 1 and 2 have any abnormalities.

In the processes at S170, S200, S250, and S280, the controller 19 derives the diagnostic result based on the voltage drop determination result for each of the inverters 1 and 2, i.e., based on the determination results of the processes at S140, S160 and S240. By deriving the diagnostic results, the controller 19 can detect/determine whether there is an ON fault of SMRs 16 and 17 (e.g., contact welding, and whether there are any abnormalities in the discharge functions of the inverters 1 and 2

When the controller 19 determines that there is no voltage drop in the capacitor voltage VC when both of the inverters 1 and 2 perform the discharge process, that is, in instances where the process at S140 determines "no voltage drop" and the process at S240 determines "no voltage drop," the controller 19 determines that the SMRs 16 and 17 have an ON fault.

When the voltage drop determination result is a "no voltage drop" determination only for the inverter 1, i.e., in instances where the controller 19 determines that there is "no voltage drop" at S140 but determines a "voltage drop" at S240, the controller 19 can determine that the discharge function of the inverter 1 is abnormal.

Similarly, when the voltage drop determination result is "no voltage drop" determination only for the inverter 2, that is, in instances where the controller 19 determines a "voltage drop" S140 but determines "no voltage drop" at S160, the controller 19 determines that the discharge function of the inverter 2 is abnormal.

When the controller 19 determines that only one of the inverters 1 and 2 has a "no voltage drop" determination, the controller 19 determines that the inverter with the "no voltage drop" determination result has the abnormality of the discharge function.

By configuring the controller 19 in such manner, it is possible to distinguish the ON fault of the SMRs 16 and 17 from the abnormalities of the discharge function of each of the inverters 1 and 2. By the distinguishing among the different faults and abnormalities, the controller 19 can limit and/or prevent the occurrence of inappropriate fail-safe operations and unnecessary component replacements.

In the processes at S220, S270, and S290, the controller 19 performs different safety procedures for an ON fault case and for an abnormal discharge case, i.e., the fail-safe procedure for handling the ON fault of the SMRs 16 and 17 at S290 and the safety procedures for handling the abnormality of the discharge function of at least one of the inverters 1 and 2 at S220 and S270 are different. As such, the controller 19 can initiate an appropriate safety procedure depending on the type and severity of the fault or abnormality.

The controller 19 performs the diagnostic process of FIG. 2 after the power switch of the vehicle is turned OFF. As such, the discharge of the capacitors C1 and C2 by the diagnostic process of FIG. 2 is performed as part of a termination or shut down sequence in the vehicle. Because the diagnostic process of FIG. 2 is performed during the shutdown of the vehicle and relies on the discharge of the capacitors C1 and C2, the capacitors are not unnecessarily charged and discharged during vehicle operation, which can contribute to a reduction in the energy consumption of the vehicle.

In the processes at S180, S210, and S260, when the controller 19 does not detect an ON fault for the SMRs 16 and 17, the controller 19 instructs any inverter determined as not having an abnormality in the discharge function to perform the discharge function. As such, even if one of the inverters 1 and 2 has an abnormality of the discharge function, the capacitors C1 and C2 can still be completely discharged. Complete discharge of the capacitors C1 and C2 limits and/or prevents possible electric shock from charge stored in the capacitors C1 and C2.

In the diagnostic process described above, the processes performed at S120, S130, S140, S150, S160 (i.e., S120-S160), S230, and S240 are described as being performed by the controller 19. However, the controller 19 during the processes at S120-S160, S230, and S240 functions as a discharge controller. As such, the controller 19 may be referred to as a discharge controller when performing the processes at S120-S160, S230, and S240. Alternatively, the controller 19 may include a specialized circuit such as an ASIC or FPGA (not shown) where such a specialized circuit may be referred to as a discharge controller and be specifically configured to perform the processes at S120-S160, S230, and S240.

The processes at S170, S200, S250, and S280 are described as being performed by the controller 19. However, the controller 19 during the processes at S170, S200, S250, and S280 functions as an abnormality determiner. As such, the controller 19 may be referred to as an abnormality controller when performing the processes at S170, S200, S250, and S280. Alternatively, the controller 19 may include a specialized circuit such as an ASIC or FPGA (not shown) where such a specialized circuit may be referred to as an abnormality determiner and be specifically configured to perform the processes at S170, S200, S250, and S280.

The processes at S220, S270, and S290 are described as being performed by the controller 19. However, the controller 19 during the processes at S200, S270, and S290 functions as a safety controller. As such, the controller 19 may be referred to as a safety controller when performing the processes at S200, S270, and S290. Alternatively, the controller 19 may include a specialized circuit such as an ASIC or FPGA (not shown) where such a specialized circuit may be referred to as a safety controller and be specifically configured to perform the processes at S220, S270, and S290.

The processes at S180, S210, and S260 are described as being performed by the controller 19. However, the controller 19 during the processes at S180, S210, and S260 functions as a complete discharge controller. As such, the controller 19 may be referred to as a complete discharge controller when performing the processes at S180, S210, and S260. Alternatively, the controller 19 may include a specialized circuit such as an ASIC or FPGA (not shown) where such a specialized circuit may be referred to as a complete discharge controller and be specifically configured to perform the processes at S180, S210, and S260.

Second Embodiment

[2-1. Difference from the First Embodiment]

Since the diagnostic process of the second embodiment is similar to the diagnostic process of the first embodiment, the description of the second embodiment mainly focuses on the differences from the first embodiment.

Figure 3:
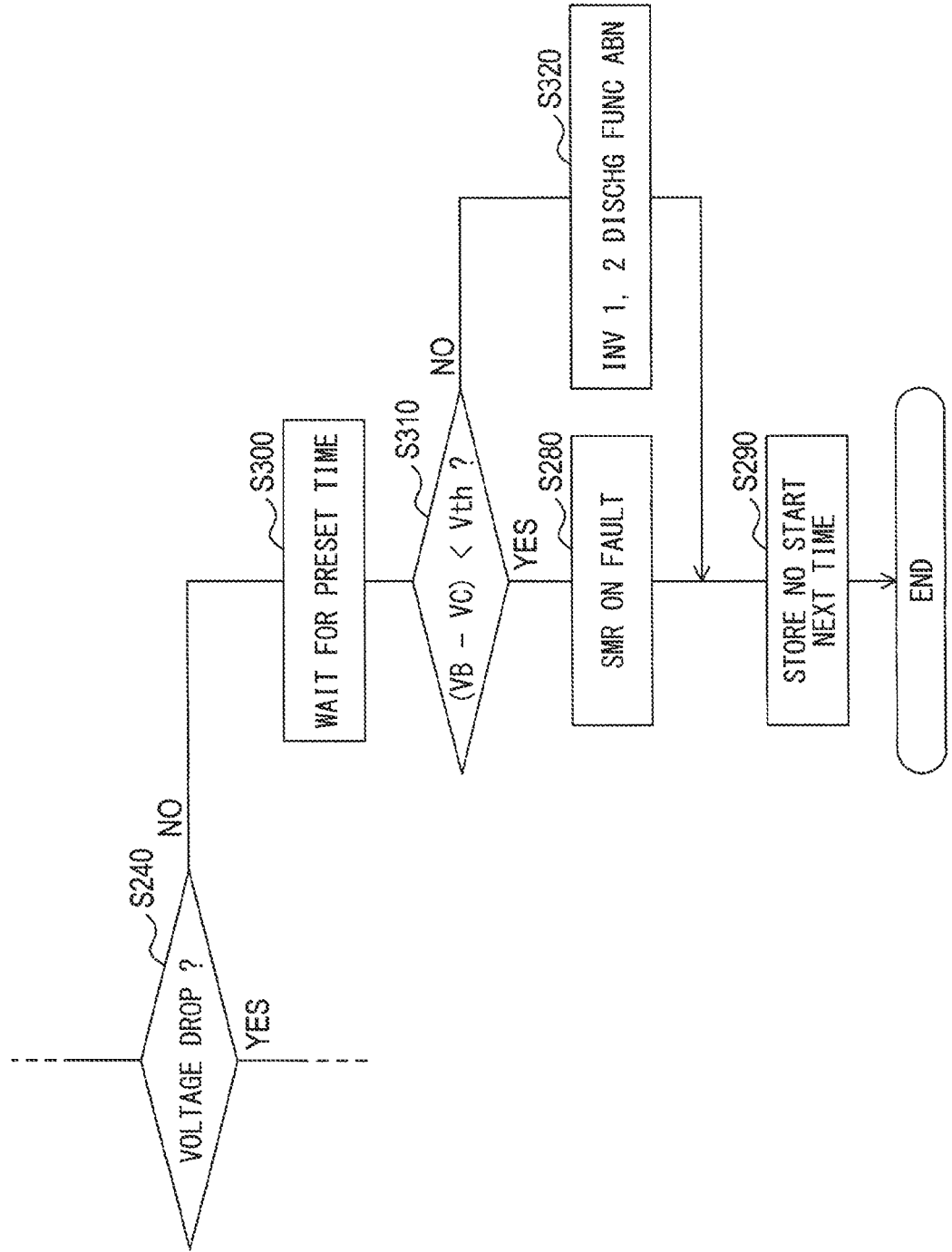
FIG. 3 is a flowchart of a diagnostic process in the second embodiment.

In the second embodiment, the controller 19 performs the diagnostic process shown in FIG. 3 instead of the diagnostic process of FIG. 2. In the diagnostic process shown in FIG. 3, additional processes at S300, S310, and S320 are added to the diagnostic process of FIG. 2. The diagnostic process of the second embodiment is substantially similar to the diagnostic process of the first embodiment, but with additional processes. As such, FIG. 3 does not show all of the processes shown in FIG. 2, focusing mainly on the added processes at S300, S310, and S320.

[2-2. Process]

As shown in FIG. 3, when the controller 19 determines that the capacitor voltage VC does not drop at S240, that is, when the controller 19 makes a "no voltage drop" determination at S140 and S240 where the controller 19 determines that there is an abnormality in the discharge processes of the inverters 1 and 2, the process proceeds to S300. At S300, the controller 19 waits for a predetermined (i.e., preset) amount of time before continuing the diagnostic process.

At S310, the controller 19 detects and compares the battery voltage VB of the high voltage battery 15 and the capacitor voltage VC. Specifically, at S310, the controller 19 determines whether "VB−VC" is smaller than a predetermined threshold value Vth. If "VB−VC" is smaller than the threshold value Vth, i.e., "YES" at S310, the controller 19 determines that the battery voltage VB and that capacitor voltage VC are at or around the same value, and the process proceeds to S280. For example, the battery voltage VB and the capacitor voltage VC may be the same value such that the difference between the battery voltage VB and the capacitor voltage VC (VB−VC) is zero. At S280, the controller 19 determines that the SMRs 16 and 17 have an ON fault and stores the ON fault determination in the memory 22 as a diagnostic result, and the process then proceeds to S290.

If the controller 19 determines that "VB−VC" is not smaller than the threshold value Vth, i.e., "NO" at S310, the controller 19 determines that there is a difference between VB and VC (i.e., that VB and VC are not at or around the same value), and the process proceeds to S320. For example, the battery voltage VB and the capacitor voltage VC may have different values such that the difference between the battery voltage VB and the capacitor voltage VC (i.e., VB−VC) is not equal to zero. At S320, the controller 19 determines that the discharge functions of both the inverters 1 and 2 are abnormal, stores the abnormal determination in the memory 22 as a diagnostic result, and then the process proceeds to S290.

[2-3. Effects]

In addition to the advantageous effects realized by the first embodiment, the present embodiment can also achieve the following advantageous effects.

When the controller 19 makes a "no voltage drop" determination for the inverters 1 and 2 (e.g., after the inverters 1 and 2 perform the discharge process) the controller 19 compares the battery voltage VB and the capacitor voltage VC. When the controller 19 determines that there is no or substantially no (i.e., very little) difference between the battery voltage VB and the capacitor voltage VC (e.g., VB−VC=0), the controller 19 determines that there is an ON fault in the SMRs 16 and 17. When the controller 19 determines that there is a difference between the battery voltage VB and the capacitor voltage VC (e.g., VB−VC≠0), the controller 19 determines that the discharge function of both the inverters 1 and 2 is abnormal.

In other words, when the SMRs 16 and 17 both have an ON fault, the battery voltage VB and the capacitor voltage VC are the same, but when the SMRs 16 and 17 do not have an ON fault, due to the self-discharge of the capacitors C1 and C2 (e.g., charge loss), the capacitor voltage VC may be lower than the battery voltage VB. As such, when the controller 19 determines that there is a difference between battery voltage VB and the capacitor voltage VC at S310, the controller 19 determines that the SMRs 16 and 17 do not have an ON fault (e.g., contact welding), but the controller determines there is an abnormality in the discharge function of both of the inverters 1 and 2.

As described in the first embodiment, there is a low probability of both the inverters 1 and 2 having simultaneous abnormalities in the discharge function, that is, both the inverters 1 and 2 experiencing abnormalities in the discharge function at the same time. However, by implementing the second embodiment described above, the controller 19 can detect abnormalities in the discharge functions of the inverters 1 and 2 that occur simultaneously while distinguishing such simultaneously occurring abnormalities from the ON faults of the SMRs 16 and 17.

When the controller 19 makes "no voltage drop" determinations for both the inverters 1 and 2, the controller 19 waits for a predetermined amount of time at S300, and then detects the battery voltage VB and the capacitor voltage VC to compares the battery VB and capacitor VC voltages. As such, if the SMRs 16 and 17 are normally OFF and the discharge functions of the two inverters 1 and 2 are both abnormal, by waiting for a predetermined amount of time, the self-discharge of the capacitors C1 and C2 can increase the difference between the battery voltage VB and the capacitor voltage VC. In such manner, the controller 19 can better distinguish between ON faults in the SMRs 16 and 17 and the abnormalities in the discharge functions of the inverters 1 and 2.

In the diagnostic process of the second embodiment, the processes at S170, S200, S250, for example, as shown in FIG. 2, and the processes at S280, S300, S310, S320 of FIG. 3 are described as being performed by the controller 19.

However, the controller 19 during the processes at S170, S200, S250, S280, S300, S310, and S320 functions as an abnormality determiner. As such, the controller 19 may be referred to as an abnormality determiner when performing the processes at S170, S200, S250, S280, S300, S310, and S320. Alternatively, the controller 19 may include a specialized circuit such as an ASIC or FPGA (not shown) where such a specialized circuit may be referred to as an abnormality determiner and be specifically configured to perform the processes at S170, S200, S250, S280, S300, S310, and S320.

Other Embodiments

Although the embodiments of the present disclosure have been described, the present disclosure is not limited to the above-described embodiments and various modifications can be made to implement the present disclosure.

For example, the control system can be configured to remove one of the two SMRs 16 and 17 so that one of the power supply lines 13 and 14 is always connected to the high voltage battery 15. Alternatively, one of the capacitors C1 and C2 may be removed from the control system. Also, the number of the inverters and the number of capacitors in the control system may be three or more.

A plurality of functions performed/executed by one element in the above-described embodiments may be implemented by using a plurality of elements, or a function performed by one element may be implemented by using a plurality of elements. A plurality of functions provided by a plurality of components may be realized by using one component, or a function realized by a plurality of components may also be realized by one component. Two or more of the above-described embodiments may be combined to realize a new embodiment. When combining two or more embodiments, some parts and features from both of the embodiments may be omitted. Additions may also be made to such a combination so that the number of elements and features in the combination of embodiments is more than the number of parts and features in the individual embodiments themselves.

In addition to the above-described controller 19, the present disclosure may be realized as a system that includes the controller 19 as a system component, as a computer program product encoded on a non-transitory, storage medium, such as a semiconductor memory for storing a computer program product, that when executed by a CPU or like processing device in the controller 19 causes the controller 19 to perform a fault diagnostic method of a vehicle.

What is claimed is:

1. A fault detection device for detecting faults in a motor driving circuit that includes: a pair of power lines, with one of the power lines connected to a positive side of a power source and having at least one power supply relay disposed thereon and another of the power lines connected to a negative side of the power source and having at least one power supply relay disposed thereon; at least one capacitor connected to each of the power lines; and a plurality of motor drivers connected in parallel with each other, each of the plurality of motor drivers connected to each of the power lines and configured to control the discharge of the at least one capacitor, the fault detection device comprising:
a discharge controller configured to
instruct each of the plurality of motor drivers at different times to perform a discharge control for discharging the at least one capacitor after performing an interruption process to turn the at least one power supply relay from ON to OFF, and
determine for each of the plurality of motor drivers whether the discharge control of the at least one capacitor causes a drop of a capacitor voltage by measuring the capacitor voltage of the at least one capacitor, after each of the plurality of motor drivers performs the discharge control of the at least one capacitor, the capacitor voltage being a voltage between two terminals of a capacitor; and
an abnormality determiner configured to detect an ON fault of the at least one power supply relay and to distinguish the ON fault from an abnormality in the discharge control of the at least one capacitor by at least one of the plurality of motor drivers based on the drop of the capacitor voltage.

2. The fault detection device of claim 1 further comprising:
a safety controller configured to perform a different safety process depending on whether the ON fault or the abnormality in the discharge control of the at least one capacitor by at least one of the plurality of motor drivers is detected by the abnormality determiner, wherein
the safety controller is further configured to not start one or more motors when a vehicle power switch is subsequently turned ON as the safety process, in response to detecting the ON fault, and wherein
the safety controller is further configured to output a notification when the vehicle power is subsequently turned ON as the safety process, in response to detecting the abnormality in the discharge control of the at least one capacitor by at least one of the plurality of motor drivers.

3. The fault detection device of claim 1, wherein
the discharge controller and the abnormality determiner are configured to operate after a power switch of the vehicle is turned OFF.

4. The fault detection device of claim 1 further comprising:
a complete discharge controller configured to control at least one of the plurality of motor drivers to perform a complete discharge of the at least one capacitor in response to
the abnormality determiner determining for the at least one of the plurality of motor drivers that there is no abnormality in the discharge control of the at least one capacitor by the at least one of the plurality of motor drivers, and
the abnormality determiner determining there is no ON fault of the at least one power supply relay.

5. The fault detection device of claim 1, wherein
the abnormality determiner is further configured to determine:
the ON fault in response to the discharge controller determining there is no voltage drop in the capacitor voltage after all of the plurality of motor drivers perform the discharge control of the at least one capacitor, and
the abnormality in the discharge control of the at least one capacitor by one of the plurality of motor drivers in response to the discharge controller determining there is no voltage drop in the capacitor voltage after the one of the plurality of motor drivers performs the discharge control of the at least one capacitor.

6. The fault detection device of claim 5, wherein
the abnormality determiner is further configured, in response to the discharge controller determining there is no voltage drop in the capacitor voltage after all of the plurality of motor drivers perform the discharge control of the at least one capacitor, to
determine the ON fault when a difference between a power source voltage and the capacitor voltage is zero, and
determine the abnormality in the discharge control of the at least one capacitor by the plurality of motor drivers when the difference between the power source voltage and the capacitor voltage is not zero.

7. The fault detection device of claim 6, wherein
the abnormality determiner is further configured to compare the power source voltage and the capacitor voltage after waiting a preset period of time in response to the discharge controller determining there is no voltage drop in the capacitor voltage after all of the plurality of motor drivers perform the discharge control of the at least one capacitor.

8. A fault detection device for detecting faults in a motor driving circuit that includes a pair of power lines, with one of the power lines connected to a positive side of a power source and having at least one power supply relay disposed thereon and another of the power lines connected to a negative side of the power source and having at least one power supply relay disposed thereon; at least one capacitor connected to each of the power lines; and a plurality of motor drivers connected in parallel with each other, each of the plurality of motor drivers connected to each of the power lines and configured to control the discharge of the at least one capacitor, the fault detection device comprising:
a controller configured to
instruct each of the plurality of motor drivers at different times to perform a discharge control for discharging the at least one capacitor after performing an interruption process to turn the at least one power supply relay from ON to OFF,
determine for each of the plurality of motor drivers whether the discharge control of the at least one capacitor causes a drop of a capacitor voltage by measuring the capacitor voltage of the at least one capacitor, after each of the plurality of motor drivers performs the discharge control of the at least one capacitor,
detect an ON fault of the at least one power supply relay and to distinguish the ON fault from an abnormality in the discharge control of the at least one capacitor by at least one of the plurality of motor drivers based on the drop of the capacitor voltage.

9. The fault detection device of claim 8, wherein the controller is further configured to
perform a different safety process depending on whether the ON fault or the abnormality in the discharge control of the at least one capacitor by the at least one of the plurality of motor drivers is detected, wherein
the controller is further configured to not start one or more motors when a vehicle power switch is turned ON as the safety process, in response to detecting the ON fault, and wherein
the controller is further configured to output a notification when the vehicle power is turned ON as the safety process, in response to detecting the abnormality in the discharge control of the at least one capacitor by the at least one of the plurality of motor drivers.

10. The fault detection device of claim 8, wherein
the controller is configured to operate after a power switch of the vehicle is turned OFF.

11. The fault detection device of claim 8, wherein
the controller is further configured to control at least one of the plurality of motor drivers to perform a complete discharge of the at least one capacitor in response to determining for the at least one of the plurality of motor drivers that there is no abnormality in the discharge control of the at least one capacitor by the at least one of the plurality of motor drivers, and determining there is no ON fault of the at least one power supply relay.

12. The fault detection device of claim 8, wherein
the controller is further configured to determine:
the ON fault in response to determining there is no voltage drop in the capacitor voltage after all of the plurality of motor drivers perform the discharge control of the at least one capacitor, and
the abnormality in the discharge control of the at least one capacitor by one of the plurality of motor drivers in response to determining there is no voltage drop in the capacitor voltage after the one of the plurality of motor drivers performs the discharge control of the at least one capacitor.

13. The fault detection device of claim 12, wherein
the controller is further configured, in response to determining there is no voltage drop in the capacitor voltage after all of the plurality of motor drivers perform the discharge control of the at least one capacitor, to
determine the ON fault when a difference between a power source voltage and the capacitor voltage is zero, and
determine the abnormality in the discharge control of the at least one capacitor by the plurality of motor drivers when the difference between the power source voltage and the capacitor voltage is not zero.

14. The fault detection device of claim 13, wherein
the controller is further configured to compare the power source voltage and the capacitor voltage after waiting a preset period of time in response to determining there is no voltage drop in the capacitor voltage after all of the plurality of motor drivers perform the discharge control of the at least one capacitor.

* * * * *